United States Patent
Yu

(10) Patent No.: US 11,334,308 B2
(45) Date of Patent: May 17, 2022

(54) DISPLAY DEVICE AND IMAGE CORRECTION METHOD

(71) Applicant: AmTRAN Technology Co., Ltd., New Taipei (TW)

(72) Inventor: Hung-Ta Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 17/449,260

(22) Filed: Sep. 29, 2021

(65) Prior Publication Data
US 2022/0107775 A1 Apr. 7, 2022

(30) Foreign Application Priority Data
Oct. 6, 2020 (TW) ................................ 109134630

(51) Int. Cl.
*G06F 3/14* (2006.01)
*G09G 5/10* (2006.01)
*G09G 3/36* (2006.01)

(52) U.S. Cl.
CPC ......... *G06F 3/1446* (2013.01); *G09G 3/3696* (2013.01); *G09G 5/10* (2013.01); *G09G 2320/0686* (2013.01); *G09G 2360/141* (2013.01); *G09G 2360/145* (2013.01)

(58) Field of Classification Search
CPC ...... G06F 3/1446; G09G 5/10; G09G 3/3696; G09G 2320/0686; G09G 2360/141; G09G 2360/145; G09G 2300/026; G09G 2320/0233; G09G 2320/0626
See application file for complete search history.

(56) References Cited

U.S. PATENT DOCUMENTS

| 9,224,361 | B2 | 12/2015 | Song et al. | |
|---|---|---|---|---|
| 2007/0103583 | A1* | 5/2007 | Burnett | H04N 9/3147 348/383 |
| 2008/0284677 | A1* | 11/2008 | Whitehead | H04N 9/3194 345/1.3 |
| 2009/0051637 | A1* | 2/2009 | Chen | G09G 3/3426 345/84 |

(Continued)

FOREIGN PATENT DOCUMENTS

| CN | 209433836 U | 9/2019 |
|---|---|---|
| TW | 201537540 A | 10/2015 |
| TW | 201715509 A | 5/2017 |

*Primary Examiner* — Antonio Xavier
(74) *Attorney, Agent, or Firm* — CKC & Partners Co., LLC

(57) ABSTRACT

The present disclosure relates to a display device including a display circuit, a sensor, a light control circuit and a processing circuit. The display unit includes a first display unit and a second display unit adjacent to the first display unit. The sensor obtains a first brightness value of the first display unit and a second brightness value of the second display unit. The light control circuit adjusts the light transmittance of multiple light control units of the light control circuit. The processing circuit calculates a brightness difference ratio value according to the first brightness value and the second brightness value. When the brightness difference ratio value is greater than a threshold value, the processing circuit adjusts a light control signal to change the light transmittance corresponding to the position of the second display unit.

19 Claims, 5 Drawing Sheets

(56) References Cited

U.S. PATENT DOCUMENTS

| | | | |
|---|---|---|---|
| 2011/0298763 A1* | 12/2011 | Mahajan | G09G 3/025 345/1.3 |
| 2012/0105507 A1* | 5/2012 | An | G09G 3/3426 345/102 |
| 2016/0358582 A1* | 12/2016 | Lee | G09G 5/10 |
| 2018/0040271 A1* | 2/2018 | Jung | G09G 3/2007 |
| 2021/0181583 A1* | 6/2021 | Kim | G06F 3/1462 |

* cited by examiner

| N4 | N6 | N9 |
|----|----|----|
| N3 | N1 | N8 |
| N2 | N5 | N7 |

DISPLAY DEVICE AND IMAGE CORRECTION METHOD

CROSS-REFERENCE TO RELATED APPLICATION

This application claims priority to Taiwan Application Serial Number 109134630, filed Oct. 6, 2020, which is herein incorporated by reference in its entirety.

BACKGROUND

Technical Field

The present disclosure relates to a display panel for adjusting the brightness according to the display screen.

Description of Related Art

With the development of display technology, display panels are widely used in daily life and become more and more important. For example, the display panel can be used in various electronic devices such as televisions, computers, and mobile phones to display various information. Generally speaking, the display panel provides a corresponding voltage to drive the pixel circuit according to an image signal to display an expected brightness or color. However, since the characteristics of each pixel circuit may be different due to the influence of the manufacturing process, each pixel circuit of the display panel has different brightness under the same driving voltage, so correction is necessary to ensure the display quality.

SUMMARY

One aspect of the present disclosure is a display device, comprising a display circuit, a sensor, a light control circuit and a processing circuit. The display circuit comprises a plurality of display units. The plurality of display units comprises a first display unit and a second display unit adjacent to the first display unit, the first display unit is provided with a first brightness value, and the second display unit is provided with a second brightness value. The sensor is configured to obtain the first brightness value and the second brightness value. The light control circuit comprises a plurality of light control units. Positions of the plurality of light control units correspond to positions of the plurality of display units, and the light control circuit adjusts a light transmittance of the plurality of light control units according to a plurality of light control signals. The processing circuit is electrically coupled to the display circuit, the sensor and the light control circuit, and configured to calculate a brightness difference ratio value according to the first brightness value and the second brightness value. When the brightness difference ratio value is greater than a threshold value, the processing circuit adjusts the plurality of light control signals to change the light transmittance of the light control unit corresponding to a position of the second display unit.

Another aspect of the present disclosure is an image correction method, comprising: driving a plurality of display units according to a driving signal, wherein positions of the plurality of display units correspond to positions of a plurality of light control units, the plurality of display units comprises a first display unit and a second display unit adjacent to the first display unit, the first display unit is provided with a first brightness value, and the second display unit is provided with a second brightness value; obtaining the first brightness value and the second brightness value; calculating a brightness difference ratio value according to the first brightness value and the second brightness value; and adjusting a light control signal output to the light control unit corresponding to the second display unit, wherein the light control signal is configured to change a light transmittance of the light control unit corresponding to the second display unit.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 2 is a schematic diagram of a part of a display circuit in some embodiments of the present disclosure.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

The present disclosure relates to an image correction method of a display device, which is configured to the display quality of the pixels of the display panel. In one embodiment, the industry uses an external camera to capture the monochrome frame projected by the display panel. After determining which areas have an unbalanced brightness, adjust a backlight circuit in the corresponding area (e.g., LED) to correct the brightness. In another embodiment, after determining which areas have an unbalanced brightness, the driving signal of the pixel circuit in the corresponding area is adjusted to increase or decrease its brightness. However, both of the above two methods are not ideal.

Figure 1:
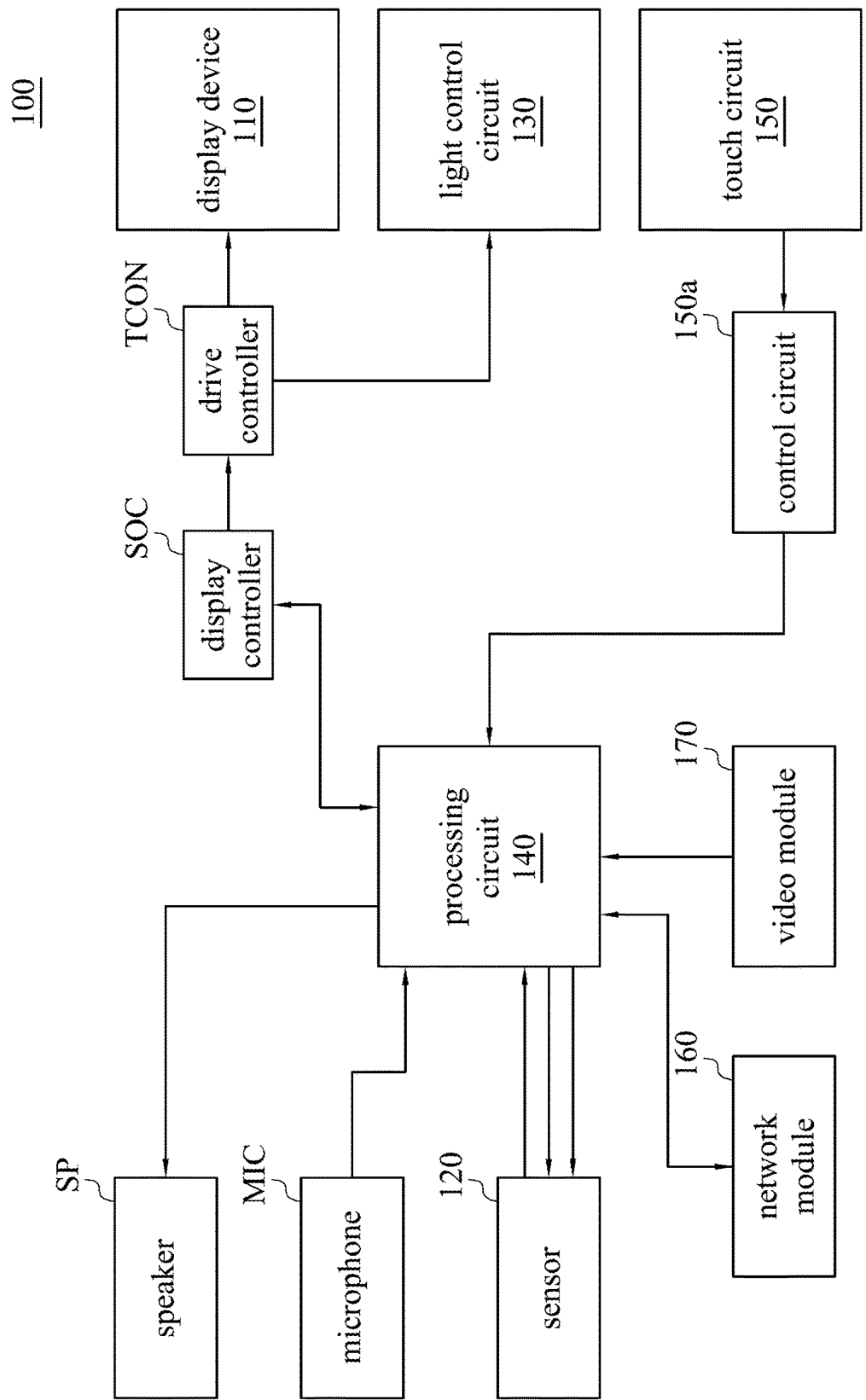
FIG. 1 is a schematic diagram of a display device in some embodiments of the present disclosure.
Figure 2:
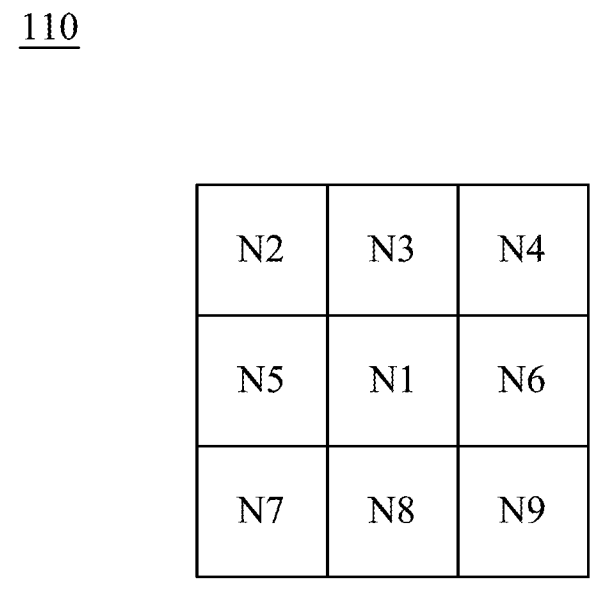

FIG. 1 is a schematic diagram of a display device in some embodiments of the present disclosure. The display device 100 at least includes a display circuit 110, a sensor 120, a light control circuit 130 and a processing circuit 140. The display circuit 110 includes multiple display units. In some embodiments, each display unit includes at least a pixel circuit. FIG. 2 is a schematic diagram of a part of a display circuit 110 in some embodiments of the present disclosure. Multiple display units N1-N9 are arranged in an array, and each display unit N1-N9 includes one or more pixel circuits. That is, the area of multiple adjacent pixel circuits can be set as a display unit.

The sensor 120 is configured to obtain the brightness of the image frame generated by the display circuit 110 (e.g., detecting the brightness of display units N1-N9). In some embodiments, the sensor 120 may be a camera device, which is configured to capture the image frame, and record as the brightness value of each of the display units N1-N9. Here, the brightness of the first display unit N1 is called "the first brightness value", and the brightness of the second display unit N2 is called "the second brightness value". Similarly, the brightness of the third display unit N3 and the fourth display unit N4 are called the third brightness value and the fourth brightness value, respectively.

The light control circuit 130 includes multiple light control units, and positions of the light control units correspond to positions of display units N1-N9. The light control circuit 130 does not have a light-emitting function. The light control circuit 130 adjusts the light transmittance of multiple light control units according to multiple light control signals. The positions and area size of those areas (i.e., the light control unit) correspond to the display units N1-N9. Alternatively stated, the light control circuit 130 may adjust the light transmittance in the different areas, so that the light projected from the display units N1-N9 will pass through the light control unit and change its light intensity. In some other embodiments, the light passes through the light control unit and then is projected onto the display circuit 110 to display the image frame.

Specifically, the light control circuit 130 can be implemented by a liquid crystal panel (e.g., monochrome black and white liquid crystal panel), so that the light control circuit 130 can be implemented by the liquid crystal panel (e.g., black and white liquid crystal cells). The light control circuit 13 (or the processing circuit 140) changes the aperture ratio of each of the liquid crystal cells (i.e., the light control unit) through controlling the driving voltages driven multiple liquid crystal cells (e.g., monochrome black and white liquid crystal cells) in the liquid crystal panel. The light control circuit 130 of the present disclosure is not limited to liquid crystals, in some other embodiments, it can also be implemented using other materials that can adjust the light transmittance.

Figure 3:
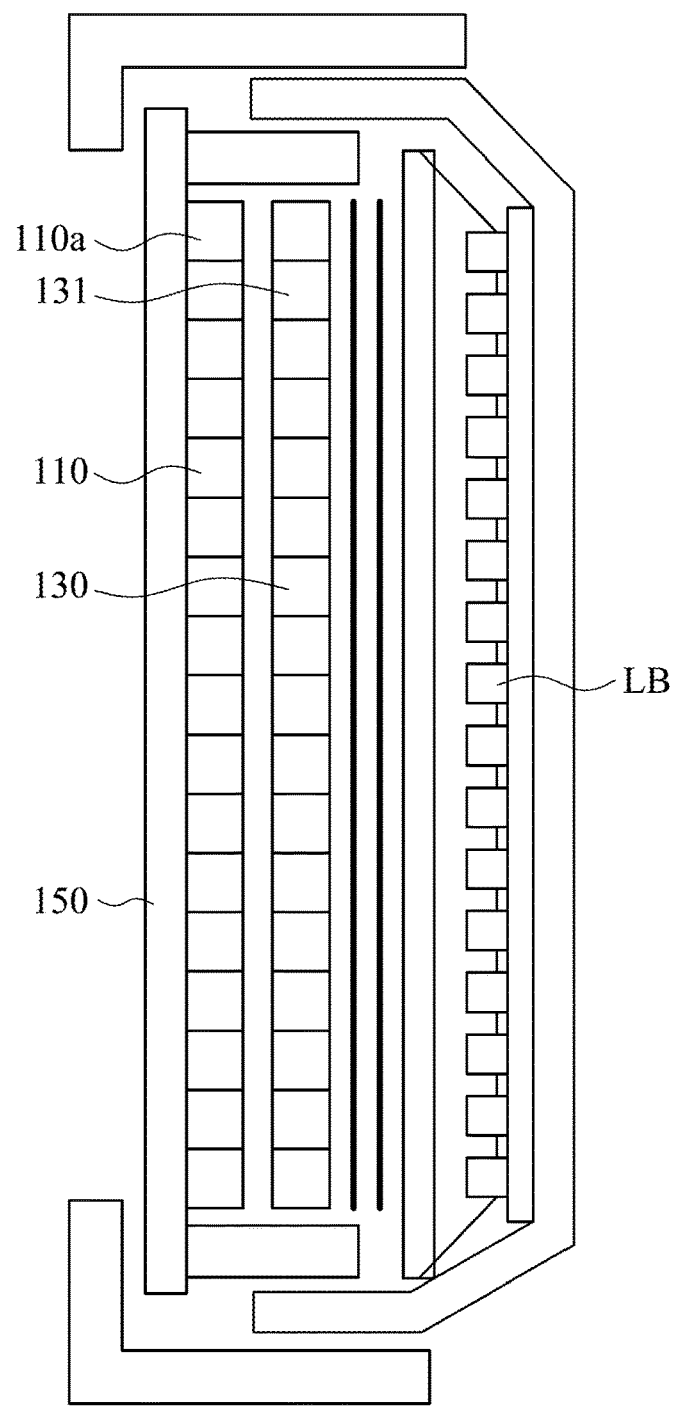
FIG. 3 is a schematic diagram of a display device in some embodiments of the present disclosure.

As shown in FIG. 2 and FIG. 3, FIG. 3 is a schematic diagram of a display device 100 in some embodiments of the present disclosure. The light control circuit 130 includes multiple light control units 131, positions of each the light control units 131 correspond to each display unit 110*a*. In addition, area of the light control unit 131 also corresponds to area of the display unit 110*a* (e.g., has the same area).

Furthermore, in some embodiments, the display circuit 110 may be implemented by the liquid crystal panel (LCD). Since the LCD unable to emit light, the display device 100 also includes a backlight circuit LB. The backlight circuit LB includes multiple light-emitting elements (e.g., light bar) as the light source. In this embodiment, the light control circuit 130 is arranged between the backlight circuit LB and the display circuit 110. That is, the light generated by the backlight circuit LB first passes the light control circuit 130, and after the brightness is adjusted by the light control circuit 130, the light passes through the display circuit 110.

In addition, the display circuit 110 can also be implemented using components with light-emitting capabilities (e.g., LED panels), so that the backlight circuit LB is not required.

The processing circuit 140 is electrically coupled to the display circuit 110, the sensor 120 and the light control circuit 130. The sensor 120 measures brightness of the display units, and transmit the brightness value corresponding to each display unit to the processing circuit 140. After receiving the brightness value, the processing circuit 140 compares the brightness value of a specific display unit with the brightness value of at least one adjacent display unit, so as to calculate a brightness difference ratio value. For example, the processing circuit 140 compares the first brightness value (e.g., 100) of the first display unit N1 with the second brightness value (e.g., 106) of the adjacent second display unit N2, and the calculated brightness difference ratio value is 6% (i.e., subtract the two brightness values, take the absolute value, and divide by the first brightness value). If the brightness difference ratio value is greater than a threshold value (e.g., 5%), the processing circuit 140 will adjust the light control signal output to the light control circuit 130, so as to change the light transmittance corresponding to the position/area of the second display unit N2 of the light control circuit 130. In one embodiment, the threshold value can be between 3% and 6%, but the present disclosure is not limited to this.

In some embodiments, if the processing circuit 140 determines that the second brightness value is greater than the first brightness value, and the brightness difference ratio value is greater than the threshold value, the processing circuit 140 decreases the corresponding light control signal according to the brightness difference ratio value. For example, the second brightness value is 6% larger than the first brightness value, the processing circuit 140 controls the light control signal output to the light control unit (whose position corresponds to the second display unit N2) to decrease the light transmittance of the position by 6%.

In some other embodiments, the processing circuit 140 compares the brightness values of the first display unit N1 and the brightness values of the multiple adjacent display units. For example, the processing circuit 140 compares the first difference ratio between the first brightness value (e.g., 100) and the second brightness value (e.g., 106), and compares the second difference ratio between the first brightness value (e.g., 100) and the third brightness value (e.g., 98). As long as the first difference ratio or the second difference ratio is greater than the threshold value, the processing circuit 140 adjusts the light control signal output to the light control unit corresponding to the second display unit N2. In some other embodiments, the processing circuit 140 can use the largest difference value in the comparison result as the brightness difference ratio value. For example, if the difference ratio between the first brightness value and the second brightness value is 6%, the difference ratio between the first brightness value and the third brightness value is 2%, the processing circuit 140 uses the difference ratio between the first brightness value and the second brightness value "6%" as "the brightness difference ratio value", and determines whether the brightness difference ratio value is greater than or equal to the threshold value.

As mentioned above, in some other embodiments, the processing circuit 140 is configured to compare the brightness value of the first display unit N1 and the brightness value of other display units surrounding the first display unit N1 to obtain the difference ratio. As shown in FIG. 3, the second display unit N2—the ninth display unit N9 are display units surrounding the first display unit N1. In some other embodiments, the processing circuit may select the display units parallel to the first display unit N1 as the comparison target (e.g., the fifth display unit N5 and the sixth display unit N6), or select the display units adjacent to the first display unit N1 in the vertical direction as the comparison target (e.g., the third display unit N3 and eighth display unit N8).

FIG. 3 is only a partial schematic diagram of the display circuit 110, the processing circuit 140 compares the brightness difference ratio value of each display unit of the display circuit 110 with the adjacent display units to determine which areas need to be corrected. The following table is an example of all the calculated brightness difference ratio values. Each field in the table represents the brightness difference ratio value between a display unit and its surrounding display units.

| 4.0% | 3.0% | 2.6% | 2.7% | 2.0% | 1.7% |
| 3.7% | 6.4% | 6.2% | 5.3% | 2.2% | 5.6% |
| 6.0% | 5.8% | 5.0% | 3.0% | 2.2% | 3.1% |

Accordingly, since the light control circuit 130 may change the brightness of multiple display units of the display circuit 110 projected to the outside of the display device 100, the light control signal can be adjusted to correct the problem of excessive brightness differences between multiple display units. For example, adjusting the brightness of the light control circuit 130 corresponding to the display unit, where the brightness difference ratio value is greater than 5%, so that the overall image uniformity of the display circuit 110 can be improved.

Figure 4:
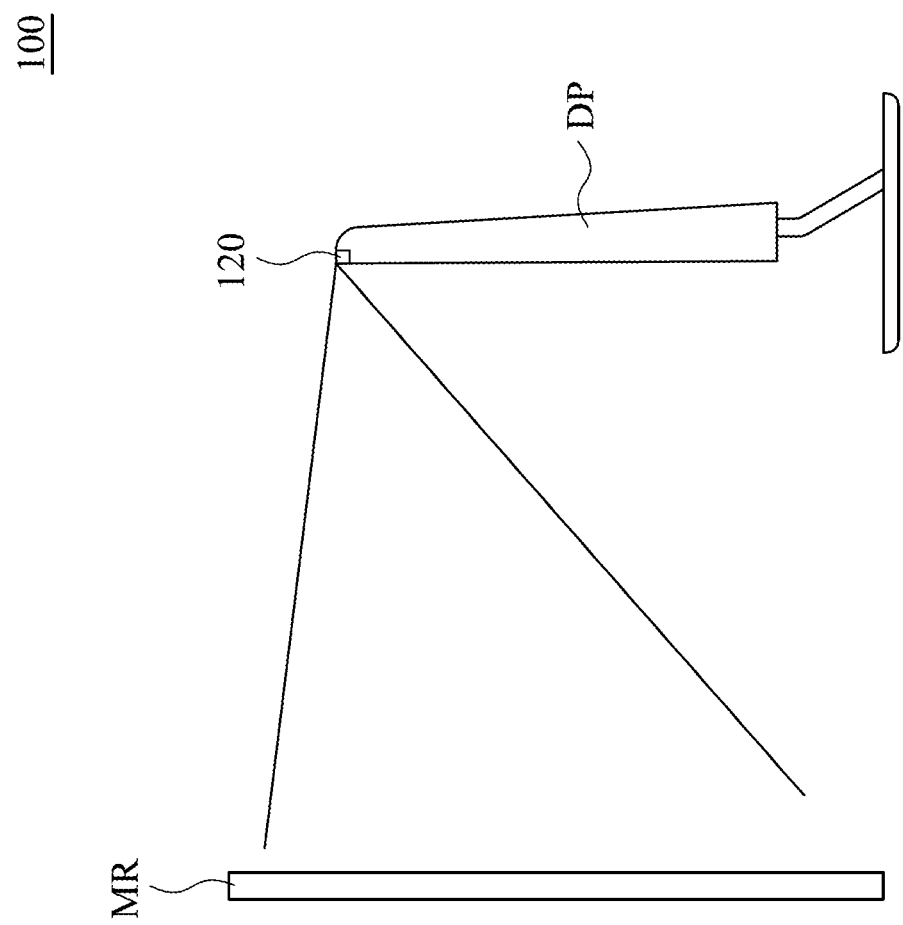
FIG. 4 is a schematic diagram of a display device during the correction program in some embodiments of the present disclosure.

As shown in FIG. 1, FIG. 3 and FIG. 4, wherein FIG. 4 is a schematic diagram of a display device 100 during the correction program in some embodiments of the present disclosure. In some embodiments, the sensor 120 (camera device) and the display circuit 110 are arranged in a display panel, and a detection direction of the sensor 120 is the same as an image projection direction of the display circuit 110. During performing the correction program, the sensor 120 captures the image frame generated by the display circuit 110 through the reflection of a mirror MR. Specifically, the correction program of the display device 100 can be executed before being sold on the market. In the case that the sensor 120 and the display circuit 110 are arranged on the same panel, the industry can directly perform the correction program without changing the product line.

In some embodiments, the display device 100 can be used as a conference video system. As shown in FIG. 1, the sensor 120 of the display device 100 is used as a video camera. In addition, the display device 100 also includes a touch circuit 150, a network module 160, a video module 170, a speaker SP and a microphone MIC. The touch signal received by the touch circuit 150 will be transmitted to the control circuit 150a. The processing circuit 140 drives a display controller TCON to drive the display circuit 110 through the display controller SOC. Since those in the art can understand the operation of the display circuit 110 and the touch circuit 150, they will not be repeated here.

Figure 5:
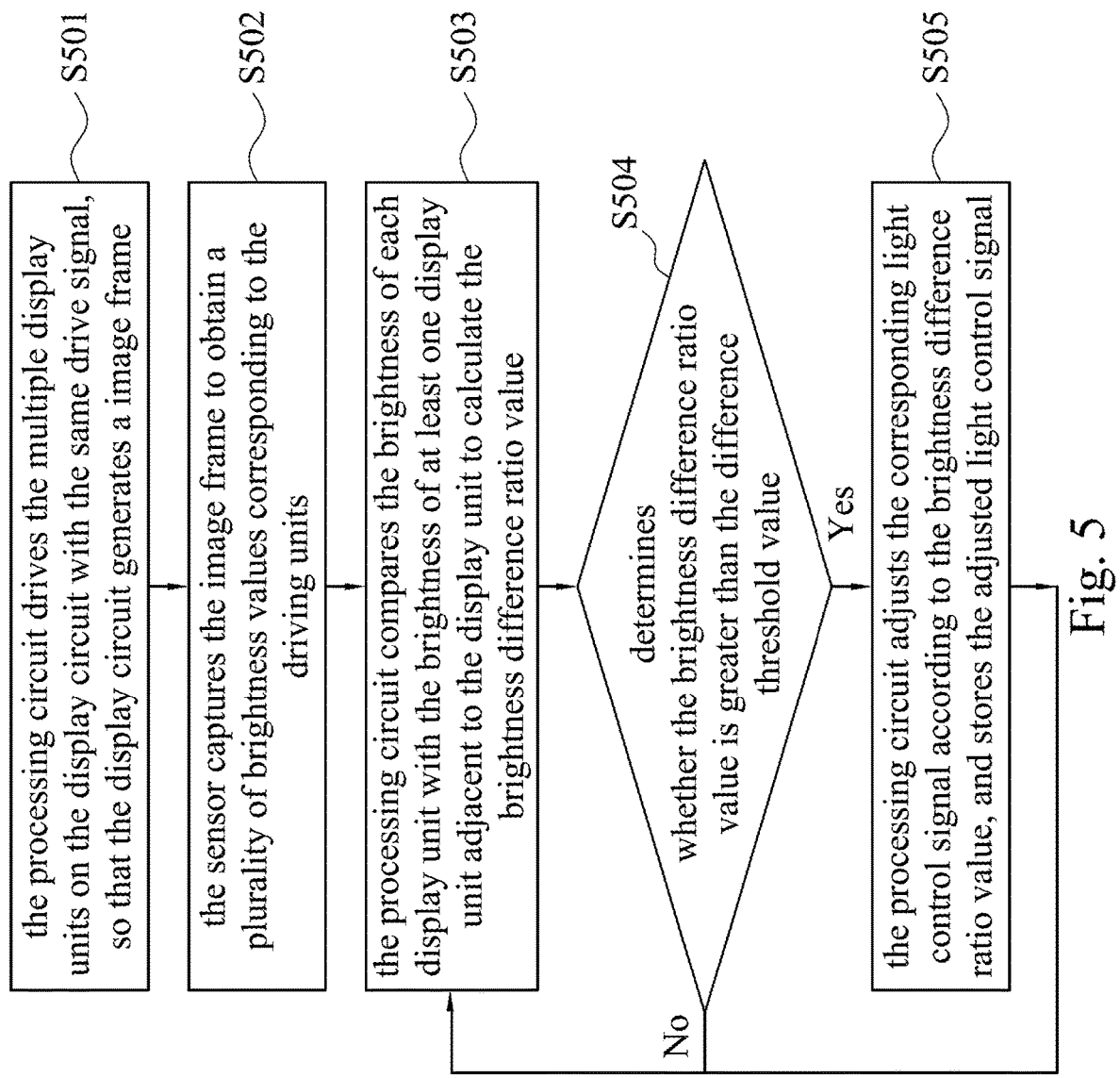
FIG. 5 is a flowchart illustrating an image correction method in some embodiments of the present disclosure.

FIG. 5 is a flowchart illustrating an image correction method in some embodiments of the present disclosure. In step S501, the processing circuit 140 drives the multiple display units 110a on the display circuit 110 with the same drive signal through the display controller TCON, so that the display circuit 110 generates a monochromatic image frame (e.g., the all-white picture with the highest grayscale value) through the display units 110a. In step S502, the sensor 120 captures the image frame to obtain a plurality of brightness values corresponding to the display units 110a.

In step S503, the processing circuit 140 compares the brightness of each display unit 110a with the brightness of at least one display unit adjacent to the display unit 110a to calculate the brightness difference ratio value. As shown in the embodiment shown in FIG. 2, the processing circuit 140 can select one of the display units N2-N9 (surrounding the first display unit N1), the brightness of which is the biggest difference from the brightness of the first display unit N1, and use the biggest difference as the brightness difference ratio value.

In step S504, after receiving the brightness difference ratio value, the processing circuit determines whether the brightness difference ratio value is greater than the threshold value. If the brightness difference ratio value is not greater than the threshold value, return to perform step S503 to calculate the brightness difference ratio value between another display unit 110a and adjacent display units 110a, until the brightness difference ratio value of all display units 110a on the display circuit 110 is confirmed.

Relatively, if the brightness difference ratio value is greater than the threshold value (in one embodiment, as long as the brightness difference of any display unit N2-N9 surrounding the first display unit N1 is too large, the condition is match), in step S505, the processing circuit 140 adjusts the corresponding light control signal according to the brightness difference ratio value, and stores the adjusted light control signal (e.g., if the brightness is too high, decrease the light transmittance of the corresponding area). In other words, when the display device 100 is operating, the processing circuit 140 will adjust the light control signal output to the corresponding light control unit to change the light transmittance. In some embodiments, the light control unit is a liquid crystal, and the processing circuit adjusts the driving voltage, which is output to the corresponding light control unit, to change the aperture ratio of the liquid crystal.

After performing the correction program, the processing circuit 140 will store the adjusted light control signal. When the display device 100 receives other driving signals, and drives the display circuit 110 to generate the image frame (i.e., the state of being used by users after sale), the processing circuit 140 will drive the light control circuit 130 (or a part of the light control unit on the light control circuit 130) according to the adjusted light control signal synchronously.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:
1. A display device, comprising:
a display circuit comprising a plurality of display units, wherein the plurality of display units comprises a first display unit and a second display unit adjacent to the first display unit, the first display unit is provided with a first brightness value, and the second display unit is provided with a second brightness value;
a sensor configured to obtain the first brightness value and the second brightness value;

a light control circuit comprising a plurality of light control units, wherein positions of the plurality of light control units correspond to positions of the plurality of display units, and the light control circuit adjusts a light transmittance of the plurality of light control units according to a plurality of light control signals; and a processing circuit electrically coupled to the display circuit, the sensor and the light control circuit, and configured to calculate a brightness difference ratio value according to the first brightness value and the second brightness value, wherein when the brightness difference ratio value is greater than a threshold value, the processing circuit adjusts the plurality of light control signals to change the light transmittance of the light control unit corresponding to a position of the second display unit.

2. The display device of claim 1, wherein the light control circuit is a monochrome liquid crystal panel, and the plurality of light control signals are a plurality of driving voltages for driving a plurality of liquid crystal cells on the monochrome liquid crystal panel.

3. The display device of claim 1, wherein when the second brightness value is greater than the first brightness value, and the brightness difference ratio value is greater than the threshold value, the processing circuit adjusts the light control signal of the light control unit corresponding to the second display unit, so as to decrease the light transmittance of the light control unit corresponding to a position of the second display unit.

4. The display device of claim 1, wherein the sensor is a camera device configured to capture an image frame displayed by the display circuit.

5. The display device of claim 4, wherein the camera device and the display circuit are arranged in a display panel, and the camera device captures the image frame displayed by the display circuit through a mirror.

6. The display device of claim 1, wherein the plurality of display units comprises a third display unit adjacent to the first display unit, the third display unit is provided with a third brightness value, the processing circuit is configured to compare a first difference ratio between the first brightness value and the second brightness value, and compare a second difference ratio between the first brightness value and the third brightness value, when the first difference ratio or the second difference ratio is greater than the threshold value, the processing circuit adjusts the plurality of light control signals.

7. The display device of claim 1, wherein the processing circuit is configured to compare a plurality of difference ratios between the first display unit and the display units surrounding the first display unit.

8. The display device of claim 1, wherein each of the plurality of display units corresponds to a plurality of pixel circuits of the display circuit, and a first area of the plurality of light control units corresponds to a second area of the plurality of display units.

9. The display device of claim 1, further comprising a backlight circuit, wherein the light control circuit is arranged between the backlight circuit and the display circuit.

10. An image correction method, comprising:

driving a plurality of display units according to a driving signal, wherein positions of the plurality of display units correspond to positions of a plurality of light control units, the plurality of display units comprises a first display unit and a second display unit adjacent to the first display unit, the first display unit is provided with a first brightness value, and the second display unit is provided with a second brightness value;

obtaining the first brightness value and the second brightness value;

calculating a brightness difference ratio value according to the first brightness value and the second brightness value; and adjusting a light control signal output to the light control unit corresponding to the second display unit when the brightness difference ratio value is greater than a threshold value, wherein the light control signal is configured to change a light transmittance of the light control unit corresponding to the second display unit.

11. The image correction method of claim 10, wherein the plurality of light control units is a plurality of monochrome liquid crystal cells in a monochrome liquid crystal panel.

12. The image correction method of claim 10, wherein adjusting the light control signal that is output to the light control unit corresponding to the second display unit comprises:

adjusting a driving voltage that is output to the light control unit corresponding to the second display unit, so as to change an aperture ratio of the light control unit.

13. The image correction method of claim 10, wherein adjusting the light control signal output to the light control unit corresponding to the second display unit comprises:

adjusting the light control signal according to the brightness difference ratio value when the second brightness value is greater than the first brightness value, so as to decrease the light transmittance of the light control unit.

14. The image correction method of claim 10, wherein the plurality of display units comprises a third display unit adjacent to the first display unit, the third display unit is provided with a third brightness value, and the image correction method further comprises:

comparing a first difference ratio between the first brightness value and the second brightness value, and comparing a second difference ratio between the first brightness value and the third brightness value; and adjusting the light control signal that is output to the light control unit corresponding to the second display unit when the first difference ratio or the second difference ratio is greater than the threshold value.

15. The image correction method of claim 10, wherein calculating the brightness difference ratio value according to the first brightness value and the second brightness value comprises:

comparing a plurality of difference ratios between the first display unit and the display units surrounding the first display unit.

16. The image correction method of claim 10, wherein the plurality of display units display a monochrome frame with a highest grayscale value according to the driving signal.

17. The image correction method of claim 10, further comprising:

storing the adjusted light control signal; and synchronously driving the plurality of light control units according to the adjusted light control signal when the plurality of display units is driven.

18. The image correction method of claim 10, wherein obtaining the first brightness value and the second brightness value comprises:

capture an image frame displayed by the plurality of display units by a sensor, wherein a detection direction of the sensor is same as an image projection direction of the plurality of display units.

19. The image correction method of claim 18, wherein the sensor and the plurality of display units are arranged in a display panel.

\* \* \* \* \*